United States Patent Office 3,544,592
Patented Dec. 1, 1970

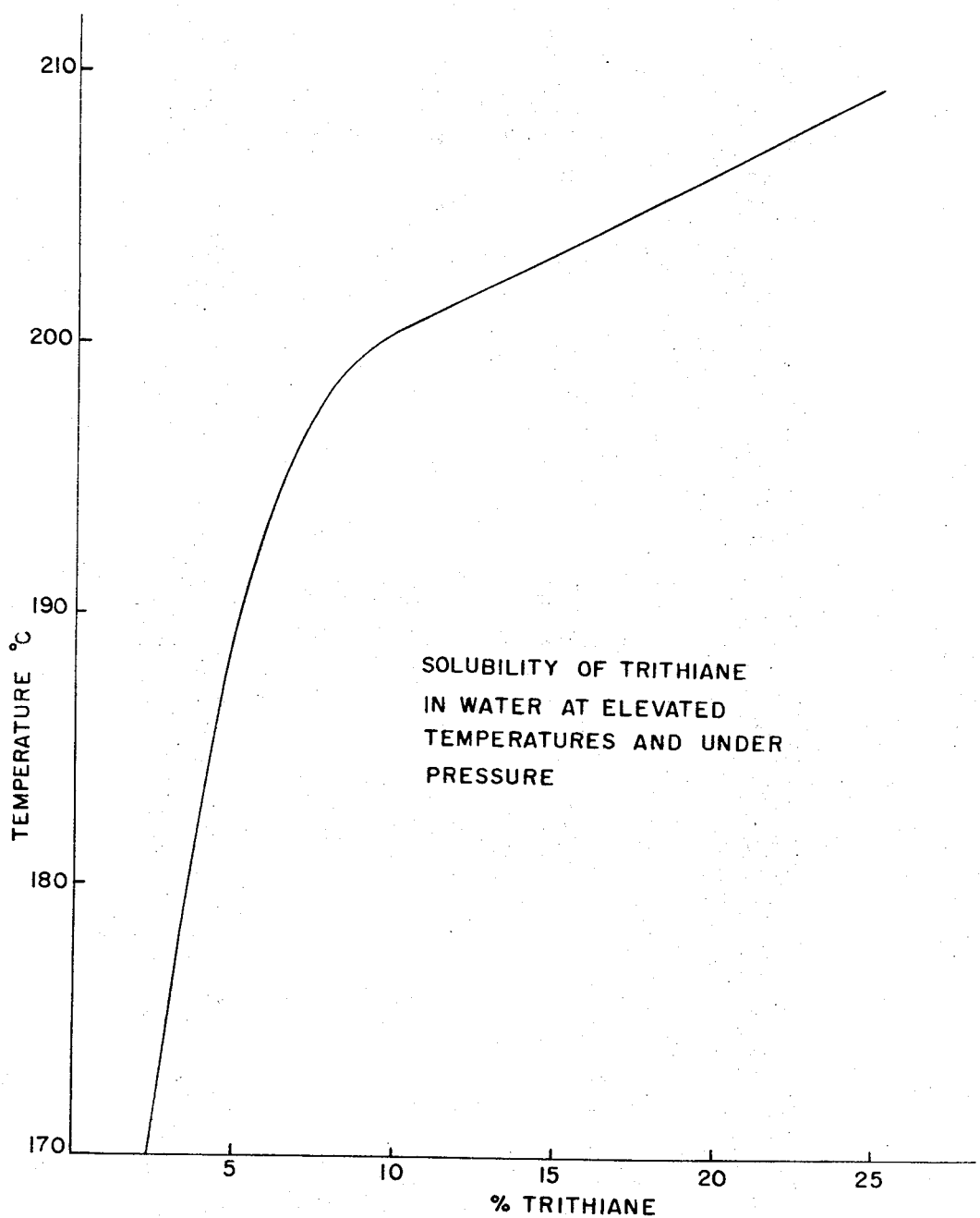

3,544,592
PROCESS FOR THE PURIFICATION OF TRITHIANE
Hans-Dieter Rupp, Erlenbach, Erhard Siggel, Seckmauern, and Gerhard Meyer, Obernburg, Germany, assignors to Glanzstoff AG, Wuppertal, Germany
Filed Nov. 28, 1967, Ser. No. 686,234
Claims priority, application Germany, Dec. 10, 1966, G 48,694
Int. Cl. C07d 77/00
U.S. Cl. 260—327          5 Claims

ABSTRACT OF THE DISCLOSURE

Process of purifying trithiane in which the impure or crude material is dissolved in water at about 170° C. to 210° C. under pressure and the trithiane is then crystallized from the solution by cooling.

---

Trithiane is a compound of known utility obtained according to a number of processes, for example by saturation of an approximately 40% formaldehyde solution in an organic solvent with hydrogen sulfide and in the presence of a concentrated salt solution. A careful purification of the resulting crude trithiane is necessary in order to achieve a reasonably pure product and particularly where the trithiane is to be converted into a polythioformaldehyde.

In attempting to purify the trithiane, a distillation is not possible because the product tends to decompose below the distillation temperature, for example at about 220° C. For the same reason, the purification cannot be accomplished by a so-called "zone melting" procedure. A sublimation of trithiane likewise fails to yield the desired result, because impurities such as mercapto compounds, sulfides, and the like, ahering to the trithiane sublime therewith.

A recrystallization of the trithiane has likewise been difficult since trithiane is soluable in only a few of the customary organic solvents and even then there is only a slight solubility. For example, the solubility of trithiane in boiling chloroform amounts to only 1.5%. In boiling benzene, the solubility is only 2.0%. Thus, while recrystallization from such organic solvents is feasible, it will be quite apparent that this procedure is very disadvantageous due to the necessarily large amounts of solvent which must be employed.

It is the primary object of the present invention to provide a method of purifying trithiane in a simple manner and with much better results then can be achieved when using previous purification techniques. More particularly, it is an object of the present invention to purify trithiane by a recrystallization procedure which does not require large amounts of solvent and which permits high yields of a pure product without danger of decomposition. These and other objects and advantages of the invention will become more apparent upon consideration of the following detailed disclosure.

It has now been found, in accordance with the invention, that excellent results are achieved by dissolving the trithiane containing impurities in water at about 170° C. to 210° C. under pressure and then crystallizing the trithiane from the resulting aqueous solution by cooling. It is particularly advantageous to dissolve the crude trithiane at about 190° C. to 210° C. while the water is maintained in the liquid phase under pressure because of the very sharply increased solubility of the trithiane under these particular conditions. The pure trithiane is crystallized or precipitated out of the aqueous solution simply by reducing the temperature to a point at which the trithiane is no longer soluble in water, preferably with a corresponding reduction in pressure. It is also an advantage of the process according to the invention that water-insoluble impurities can be readily separated while the trithiane is retained in solution at temperatures of 170°–210° C., preferably 190°–210° C.

It was quite surprising and not to be expected that water would prove to be such an excellent recrystallization medium for the purification of trithiane because trithiane is practically insoluble in cold water as well as in hot water under normal pressure, i.e. up to 100° C. However, if the temperature of the water is substantially increased while maintaining it in the liquid phase under superatmospheric pressure, a point is first reached at which the trithiane is sufficiently soluble to make recrystallization feasible and, in fact, with a further increase in temperature the trithiane suddenly becomes much more soluble in water.

The solubility characteristics of the trithiane in water at the elevated temperatures within the range according to the process of the invention are shown by the curve in the accompanying diagram wherein the solubility in percent by weight of trithiane with reference to water is plotted against the temperature. The water must of course be maintained under a suitable superatmospheric pressure in order to have a liquid phase, for example under a saturated steam atmosphere as in a closed vessel where the pressure increases with increasing temperature. It would naturally be possible to employ pressures above the saturated steam pressure but such a procedure is unnecessary when working with the water in a closed vessel. It is preferable to work in a closed vessel since the proper pressure is then established by the particular temperature being used. However, it is also possible to work in a continuous manner provided that one avoids excessive evaporation of water by maintaining a pressure approximately equivalent to the saturated steam pressure.

In the accompanying diagram, it will be noted that there is a slight but steady increase in the solubility of the trithiane from a temperature of 170° C. up to a temperature of about 190° C. where somewhat more than 5% trithiane is soluble in the water. In the range between 190° C. and 210° C., the slope of the solubility curve changes abruptly so that very substantial amounts of up to about 25% trithiane are readily soluble in water. At temperatures below 170° C., it will be apparent that the trithiane is not sufficiently soluble to have any advantage in a recrystallization procedure. Temperatures above 210° C., on the other hand, must be avoided because in spite of an even further increase in the solubility of the trithiane, a noticeable decomposition occurs with a corresponding loss of product and/or purity. The use of water under pressure at temperatures between about 170° C. and 210° C. has thus been found to be ideal for the recrystallization of the trithiane. Thus, the solubility of the trithiane is sufficiently large within the prescribed temperature range and particularly at 190–210° C., while at lower temperatures and normal pressure (1 atm.), e.g. below 100° C., the solubility of the trithiane is practically negligible. Recrystallization can therefore be accomplished with practically no loss of the trithiane during the purification procedure.

It will be apparent from the diagram that it is particularly advantageous to work between 190° C. and 210° C. since this permits about 5 to 25% by weight of trithiane to be dissolved in the water. As a result, the purification process is much more efficient in terms of the volume of water required per unit weight of trithiane being crystallized. However, even in the lower temperature interval between 170° C. and 190° C., the purification procedure according to the invention is still considerably more advantageous than a recrystallization from the usual organic solvents. The process of the invention thus provides a comparatively more rapid and efficient recrystallization with minimum losses of the pure product. Trithiane with a sharp melting point corresponding to a very high degree of purity can be achieved in just a single recrystallization step. In some cases, however, it may be desirable to repeat the recrystallization procedure in order to obtain an exceptionally pure product.

Where the crude trithiane contains only water-soluble impurities, they naturally remain in solution and the crystallized or precipitated trithiane is simply separated from the solution and recovered. On the other hand, if the trithiane also contains water-soluble impurities, these can be advantageously filtered off from the hot solution while it is maintained at 170–210° C., preferably 190–210° C. In an especially preferred embodiment of the invention, this filtration can be accomplished just prior to the cooling and precipitation of the trithiane from the hot solution. For example, the trithiane can first be dissolved in the water under pressure at the prescribed elevated temperature in any suitable dissolution zone and then filtered while transferring the hot solution to a crystallization zone cooled to a lower crystallization temperature. For example, since the dissolution zone is maintained under an elevated pressure, e.g. in a substantially closed vessel, it is possible to maintain the crystallization zone under a lower pressure and to provide a fluid connection between the two zones so that the hot aqueous solution of trithiane will flow from the zone of higher pressure to the zone of lower pressure. A filter inserted in this path of flow then separates off any water-soluble impurities.

In general, for purposes of the present invention, it is preferable to carry out the crystallization at temperatures below 100° C., for example anywhere from room temperature up to 70° C. The cooling temperature is not critical since the trithiane is practically insoluble at temperatures below the normal boiling point of water. It is also preferable to reduce the pressure back to 1 atmosphere during crystallization, provided that the temperature is correspondingly reduced to avoid excessive sudden evaporation of the water.

The process of the invention is further illustrated but not restricted to the following examples wherein the percentage solublility of trithiane is by weight with reference to water.

EXAMPLE 1

13 grams of trithiane containing water-soluble impurities are introduced together with 500 ml. of water into a 1-liter capacity autoclave and heated therein to a temperature of 170° C. The corresponding saturated steam pressure then amounted to 8 atmospheres. Under these conditions, the solubility of the trithiane is 2.6%. The aqueous solution is then cooled down to a temperature of 70° C., and a very pure trithiane crystallizes out in the form of long needles having a melting point of 215° C. By comparison, the melting point of the initial impure trithiane was 202° C.

EXAMPLE 2

50 grams of a crude trithiane having a melting point of 200° C. and containing both water-soluble and water-insoluble impurities are introduced together with 500 ml. of water into a 1-liter autoclave and heated to 201° C. at a saturated steam pressure of 15 atmospheres. In order to filter off the water-insoluble impurities, a siphon in the form of an ascending tube is positioned in the autoclave so as to extend below the surface of the aqueous solution. A filter is inserted in the tube across the path of fluid flow and the other free end of the siphon or tube conducts the aqueous solution to a second autoclave which is maintained at about atmospheric pressure. By means of a valve, the siphon or tube can be closed off while the trithiane is dissolved in the first autoclave at the prescribed elevated temperature and pressure, and when the valve is opened, the pressure differential between the two autoclaves causes the hot aqueous solution to pass through the tube with the filter separating off the water-insoluble impurities. In the second autoclave, the aqueous solution is cooled and pure trithiane is quantitatively precipitated at about atmospheric pressure. The resulting purified trithiane has a sharp melting point of 215° C.

From these examples, it will be apparent that trithiane can be readily purified without using excessively large amounts of the aqueous solvent and without decomposing the trithiane or having losses occur in separating the precipitated pure product from the solvent. Thus, when separating the crystalline product from the aqueous solvent, the crystals can be washed with cold pure water and then dried without redissolving any of the trithiane. The original source or method of preparing the impure trithiane is of little importance since the process of the invention is capable of removing both water-soluble and water-insoluble impurities.

Provided that one observes the critical temperatures of dissolution according to the invention, various modifications or variations can be made in the individual process steps of dissolution, crystallization and separation of the pure crystalline product without departing from the spirit or scope of the invention as defined by the appended claims.

The invention is hereby claimed as follows:

1. A process of purifying trithiane which comprises dissolving said trithiane in water at a temperature of about 170° C. to 210° C. under pressure and then crystallizing the trithiane from the resulting aqueous solution by cooling.

2. A process as claimed in claim 1 wherein said trithiane is dissolved in water at about 190° C. to 210° C.

3. A process as claimed in claim 1 wherein prior to said crystallization, the aqueous solution of the trithiane is filtered while maintained at said temperature of about 170–210° C. to separate water-insoluble impurities therefrom.

4. A process as claimed in claim 3 wherein said trithiane is dissolved in water and said filtration is carried out at a temperature of about 190° C. to 210° C.

5. A process as claimed in claim 3 wherein the trithiane is dissolved in said water under pressure in a dissolution zone and is then filtered while transferring the resulting hot solution to a cooled crystallization zone.

References Cited

UNITED STATES PATENTS 3,165,530  1/1965  Küllmar et al. _____ 260—327

FOREIGN PATENTS 928,124  6/1963  Great Britain.

JAMES A. PATTEN, Primary Examiner